United States Patent [19]
Kim et al.

[11] Patent Number: 6,034,348
[45] Date of Patent: Mar. 7, 2000

[54] MICRO ETCHING SYSTEM USING LASER ABLATION

[75] Inventors: Je-Ha Kim; Seok-Kil Han; Kwang-Yong Kang, all of Daejeon, Rep. of Korea

[73] Assignee: Electronics and Telecommunications Research Institute, Daejeon, Rep. of Korea

[21] Appl. No.: 08/932,546

[22] Filed: Sep. 17, 1997

[30] Foreign Application Priority Data

Dec. 18, 1996 [KR] Rep. of Korea ............. 96-67599

[51] Int. Cl.[7] .................................................. B23K 26/00
[52] U.S. Cl. ................................. 219/121.68; 219/121.82
[58] Field of Search ................ 219/121.68, 121.69, 219/121.84, 121.82; 385/33

[56] References Cited

U.S. PATENT DOCUMENTS

| | | | |
|---|---|---|---|
| 4,193,663 | 3/1980 | Timmermann | 385/33 |
| 4,199,222 | 4/1980 | Ikushima et al. | 385/93 |
| 4,941,734 | 7/1990 | Williams et al. | 385/33 |
| 5,211,805 | 5/1993 | Srinivasan | 219/121.67 |
| 5,239,160 | 8/1993 | Sakura et al. | 219/121.82 |
| 5,289,553 | 2/1994 | Oritz, Jr. et al. | 385/33 |
| 5,333,218 | 7/1994 | Ortiz, Jr. | 385/43 |
| 5,659,645 | 8/1997 | Satake | 385/33 |
| 5,660,748 | 8/1997 | Tanaka et al. | 219/121.84 |
| 5,664,036 | 9/1997 | Islam | 385/43 |
| 5,754,717 | 5/1998 | Esch | 385/31 |

OTHER PUBLICATIONS

Saiki, T., et al., Tailoring a high–transmission fiber probe for photon scanning tunneling microscope, Appl. Phys. Lett., vol. 68, No. 19, May 6, 1996, pp. 2612–2614.

Valaskovic, G.A., Parameter control, characterization, and optimization in the fabrication of optical fiber near–field probes, Applied Optics, vol. 34, No. 7, Mar. 1, 1995, pp. 1215–1228.

Primary Examiner—Geoffrey S. Evans
Attorney, Agent, or Firm—Cohen, Pontani, Lieberman & Pavane

[57] ABSTRACT

A micro etching system using laser ablation includes a laser generator, an optical fiber waveguide, a laser beam focusing device and a sample platform. The laser generator generates an ultraviolet beam, and the optical fiber waveguide carries the laser beam radiated from the laser generator to the material to be etched. The focusing device is provided between the laser generator and optical fiber waveguide and serves to concentrate the laser beam into the optical fiber. The sample platform controls the position of the material to be etched so that the material is etched at a predetermined angle by the beam emitted from the outlet of the optical fiber waveguide.

10 Claims, 2 Drawing Sheets

MICRO ETCHING SYSTEM USING LASER ABLATION

BACKGROUND OF THE INVENTION

1. Field of the Invention

The present invention relates to a micro etching system using laser ablation, and more particularly to a micro etching system for making a micro line having a few hundred nanometers of line width by using laser ablation phenomenon and a near field optic-fiber probe.

2. Description of the Related Art

Generally, laser ablation means a phenomenon that a constituent atom is isolated from a crystal in a material by using high energy obtained by concentrating laser beam on a spot on the surface of the material.

In order to obtain laser ablation in a solid material, the laser beam of an ultraviolet (UV) wavelength is commonly used. The laser beam of the UV wavelength generated from a laser has enough energy to break off the binding energy of the crystal atoms when the laser beam is concentrated on a focus by using a conventional optical lens. The focus formed by the optical lens has an area of a few $mm^2$, and the energy density for isolating a constituent atom from the surface of the target material reaches a range approximately from a few hundred milli Joule/$cm^2$ to a few Joule/$cm^2$.

Thus, it is impossible to use the conventional optical lens for making a line of a few ten nanometer line width, which is proposed by the present invention. The reason is that there is a physical restriction. Specifically, the focusing area of the lens focus cannot be smaller than the wavelength of the incident laser beam. In other words, the focusing area can not be of the size of a wavelength of 400 nm to 600 nm or less even though the beam is collected to the minimum size by using a conventional optical lens.

SUMMARY OF THE INVENTION

In view of the foregoing, it is an object of the present invention to provide a micro etching system using laser ablation in which an optical fiber is used as a waveguide for the laser light, an outlet end of the optical fiber being tapered to have a cone shape so as to take an energy density for generating laser ablation from the guided light without using any lens, the densified energy being used for directly etching the width and surface of a microstrip line, thereby the electrostatic capacity and inductance on the surface of a thin film integrated device can be microscopically controlled.

In order to accomplish the above object, the present invention provides a micro etching system using laser ablation, which comprises: a laser generation means for generating an ultraviolet beam; an optical fiber waveguide for guiding the laser beam radiated from the laser generation means; means provided between the laser generation means and the optical fiber waveguide for concentrating the laser beam into the optical fiber; and a sample platform for controlling the position of a material to be etched so that the material is etched at a predetermined angle by the beam emitted from the outlet of the optical fiber waveguide.

BRIEF DESCRIPTION OF THE DRAWINGS

The above and other objects and features of the present invention will become apparent from the following description of preferred embodiments, when taken in conjunction with the accompanying drawings, in which.

DETAILED DESCRIPTION OF THE PREFERRED EMBODIMENTS

Figure 1:
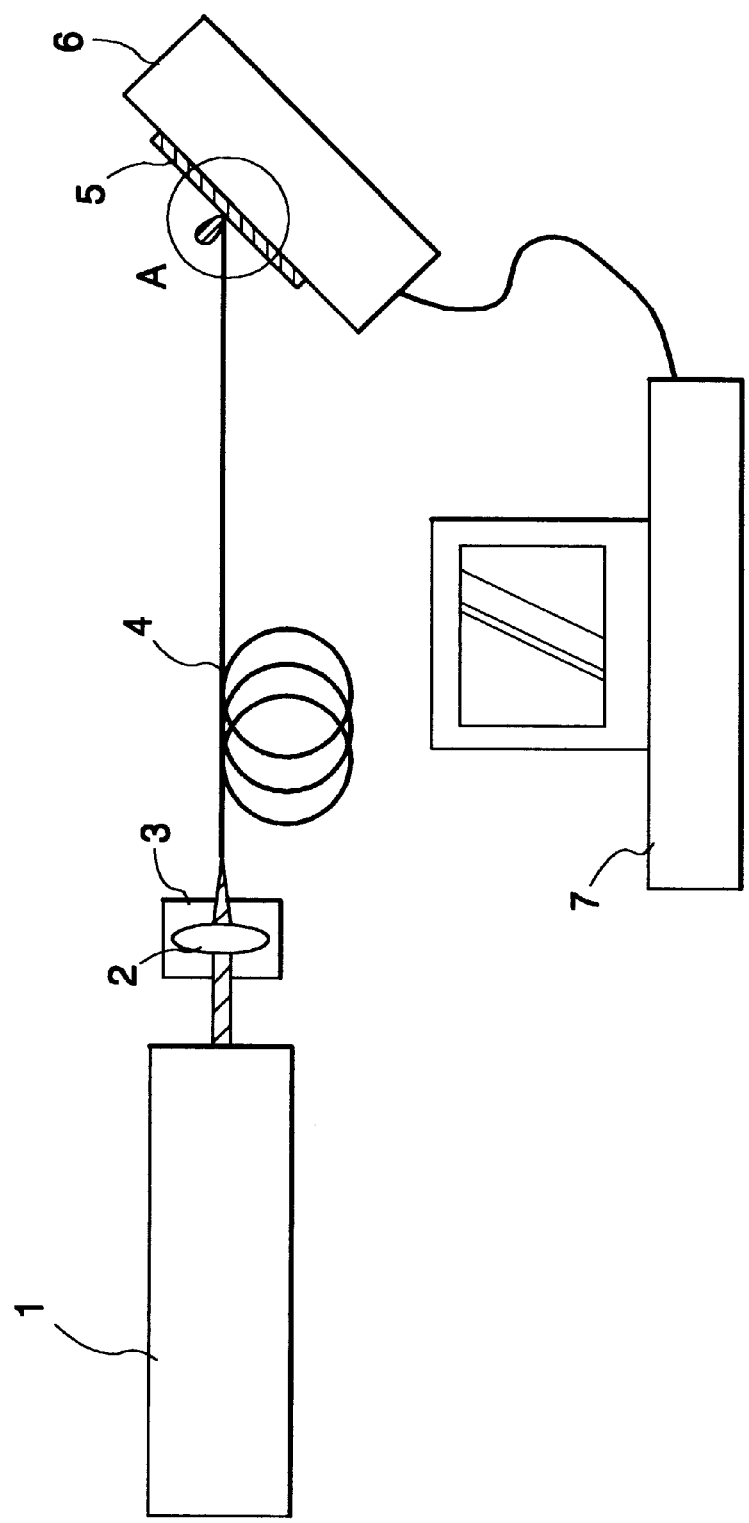
FIG. 1 is a schematic illustration showing a micro etching system using laser ablation according to an embodiment of the present invention.
Figure 2:
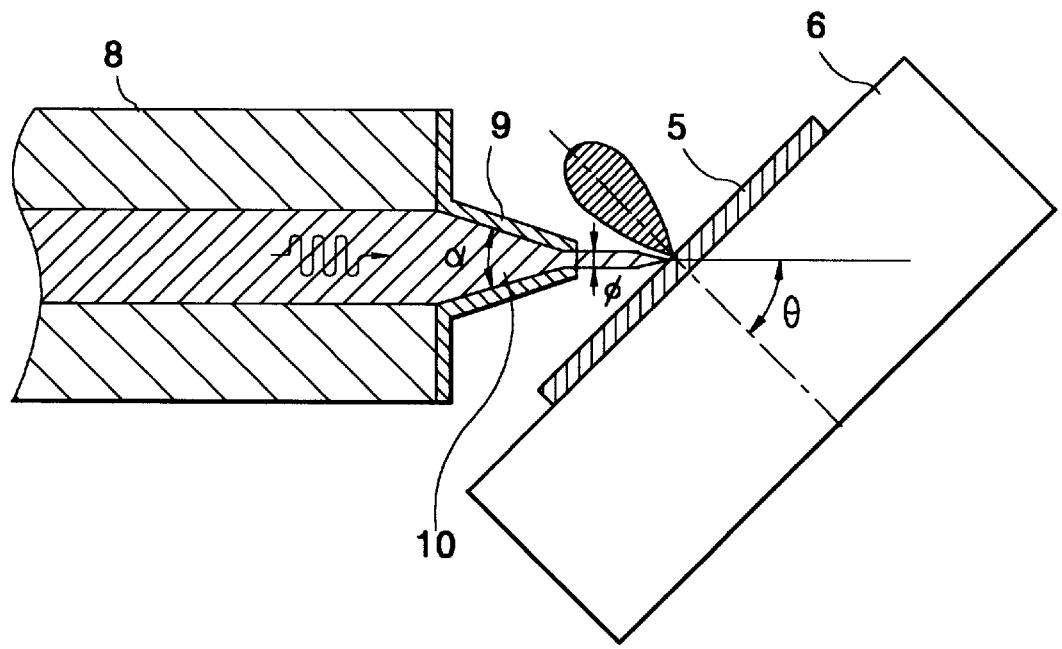
FIG. 2 is a detailed view showing a field head as an essential part of the present invention.

Referring to FIG. 1, a micro etching system using laser ablation according to the present invention comprises a laser system 1 for generating UV light used in etching, and an optical fiber waveguide 4 for providing a transmission passage of a laser beam radiated from the laser system 1.

The micro etching system also comprises a sample platform 6 by which the position of a material 5 to be etched can be controlled so that the material 5 can be etched in a predetermined direction by the beam output from an outlet of the optical fiber waveguide 4.

It is important that the optical fiber should be composed of a material through which UV light can be transmitted without loss if possible, since the light of the UV wavelength band is used in etching process. For an efficient incidence of the laser beam which is generated in and radiated from the UV laser system 1, a focusing lens 2 and a lens aligning positioner 3 are provided between the laser system 1 and the optical fiber waveguide 4, the focusing lens 2 being microscopically positioned in a direction of x-, y- or z-axis by the lens aligning positioner 3.

An end of the optical fiber waveguide 4 is cut off along a direction perpendicular to the direction extended along the length thereof so as to expose the core tip of the optical fiber, which is a medium for transmitting light, to the atmosphere. And, the laser beam from the outlet of the UV laser system 1 is radiated on the inlet of the waveguide 4 exposed to the atmosphere as much as possible. The laser energy thus radiated is set as an initial reference value for determining an amount of the energy transmitted to the other end.

The other end of the optical fiber waveguide which is an outlet of the laser is tapered to have a cone shape to form a probe tip 10, in order to transmit the incident laser energy to the other end with the minimum loss in dependence on the shape of the waveguide 4 of the optical fiber and turn the laser energy out of the waveguide.

The laser beam emitted from the optical fiber by the probe tip 10 is transmitted to the surface of the material to be etched, and the material is etched through a break away of the atom from the material by a laser ablation phenomenon.

A constant angle θ is maintained between the optical fiber and the material to be etched in order to prevent the outlet of the optical waveguide 4 from being contaminated by the rebound of the constituent atoms of the material onto which the laser is radiated, since the atoms emitted in laser ablation operation are radiated perpendicular to the surface of the material.

The material 5 to be etched is positioned on a sample platform 6 which is microscopically movable vertically or horizontally along x-, y- or z-axis. Specifically, the position of the platform 6 is adjusted by a microprocessor or a computer 7 connected thereto.

In the present embodiment, the laser system generates a light having the UV wavelength of about 200 nm~350 nm during laser ablation of the material 5 to be etched.

Figure 3:
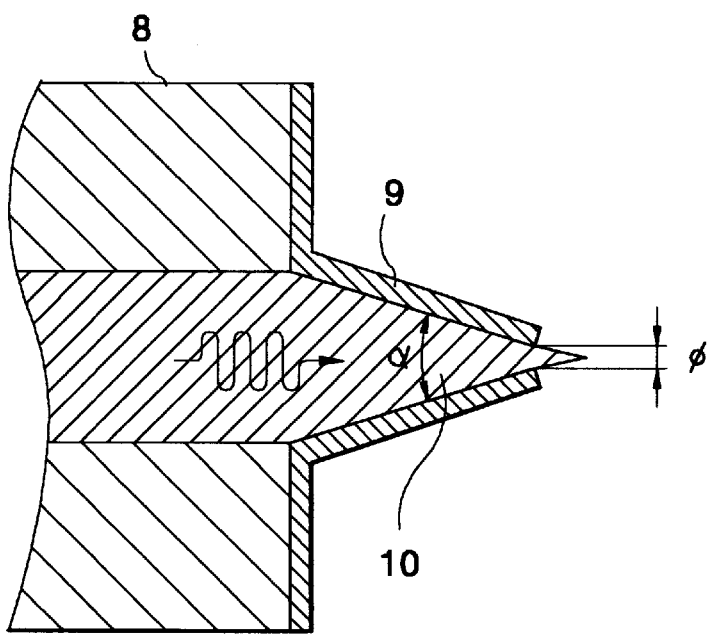
FIG. 3 is a cross sectional view of a tip of a metal clad optical fiber.

More detailed description of the optical fiber waveguide 4 is as follows. As shown in FIG. 3, the one end of the optical fiber waveguide 4 forms an inlet for the laser beam by cutting off along a direction perpendicular to the elongated direction in order to maximize the amount of the incident laser beam. The other end of the optical fiber waveguide 4 forms an outlet for the laser beam by providing the tapered probe tip 10 in order to minimize the loss of the laser beam.

The probe tip 10 of the optical fiber waveguide 4 is tapered to form a cone so as to concentrate the energy by effectively guiding the light transmitted thereto. The cone angle α is set to have an angle of 36°~40° to improve the transmission efficiency.

A selective etching process is used for obtaining the probe tip 10 having a cone shape. The cone angle α of the probe tip 10, which is a decisive parameter determining the various characteristics, is adjustable by controlling the condition of the etching solutions and the etching time. A chemical solution used for the etching solution is the composition having the volume ratio of $NH_4:HF:H_2O=X:1:1$. The etching process is controlled by the interaction between the composition of the optical fiber core and the chemical etching solution. The length of the probe tip and the cone angle is adjusted by controlling the etching time.

As described above, the probe tip 10 effectively guide the incident light transmitted through the outer surface of the tapered portion to concentrate the energy. The outer surface of the probe tip 10 is clad by a metal in order to prevent the outer surface of the probe pin 10 from being contaminated in the air and to effectively guide the light through the probe pin 10. The metal cladding 9 on the probe tip 10 may be formed by using one of the group consisting of aluminum and platinum.

It is important to form the metal cladding 9 using the aluminum or platinum in making a high quality of optical fiber probe tip. The sloped surface of the cone, excepting a part of the tip of the optical fiber, is clad by a metal through which any laser beam cannot be transmitted, and an aperture φ having a diameter of 50 nm~200 nm is formed in the tip of the optical fiber to lead the laser beam. In forming the probe tip cladding, it is important that the size of each crystal grain generated in growing of the metal thin film is minimized well enough to cover the whole area of the probe tip without any micro hole. The coated thickness of the cladding is about 200 nm.

As the inner diameter of the tapered optical fiber grows smaller, only a fundamental mode can pass through the tapered optical fiber probe tip 10 clad by the metal. In other words, the layer of the metal cladding 9 gives boundary conditions for the transmission of the laser wave motion. As above, the laser beam passed through the optical fiber goes through the aperture φ having a smaller diameter than the wavelength of the laser beam passing through the other end of the optical fiber, and ultimately laser beam of the most fundamental mode goes out of the optical fiber. Enough optical energy to directly perform the etching process is naturally concentrated as the laser beam is passed through the tapered waveguide. If the energy over a few nano Joules is passed through the aperture φ having the diameter of about 200 nm, the laser beam radiated from the end of the probe tip 10 has an energy per unit area of a few hundred milli Joules per square centimeter to a few Joules per square centimeter. It is preferable that the etching is performed in the adjacent area to the field area in a region to be etched since the laser beam is diverged from the optical fiber tip 10.

The laser beam with high energy passing through the optical fiber is converged as the laser beam is passed through the tapered waveguide 4. It is preferable that the energy of about 1.1 $GW/cm^2$ (or, 10 $J/cm^2$) or more is not applied in order to prevent the optical fiber core being defected by the high energy converged thereto when the crystal optical fiber is used. To this end, it is necessary to control the initial laser energy and optimize the cone angle α of the tapered probe tip. The preferred cone angle α is 36~40°

If the laser beam is transmitted through the tapered optical fiber probe tip 10 clad by the metal 9, the amount of the transmitted light through the aperture φ is limited. According to the disclosed literatures, only one photon of 105~106 photons can be passed. In this case, the light which does not passed is confined in the optical fiber, thereby heating the optical fiber tip. Thus, in case of failing control the amount of the light passing through the optical fiber tip, the lateral length of the line exposed to the light becomes irregular.

It is important to maintain the whole length of the probe tip 10 at the reasonable level. The cone angle α and the tip length of the probe tip 10 can be optimized by properly controlling the interaction between the composition of the optical fiber core and the chemical solution used for etching in the step of selectively etching the optical fiber. It is known that the transmission efficiency of the light and the energy integrity is abruptly varied according to the cone angle α of the optical fiber probe tip. Therefore, it is important to optimize the cone angle α of the probe tip in order to achieve the effective micro etching.

In the scanning near field optical lithography using the tapered optical fiber, the end of the optical fiber serves as a smaller light source than the incident laser wavelength performing the high resolution photolithography in which an available linear photo resist is used. When the micro lithography is performed as above, the lateral dimension can be reduced by about five times in comparison with the used maximum wavelength. If this micro lithography is used, the lateral resolution of thus formed line is largely affected by the lateral vibration of the optical fiber tip.

Reference numeral 8 is the optical fiber cladding.

According to the present invention, timing or scribing of the fine line having the size of a few hundred nanometer is possible, and the utilizing thereof is simple. And, the optimization of the device can be provided in the micro strip type microwave integrated circuit which uses a high temperature superconductor which is in the spotlight in the field of the micro electronics, since a fine control of the surface electrostatic capacitance and inductance is possible by adjusting the width and area of the micro strip line through a direct dry etching. Further, a Josephson junction can be established by etching a line on the surface of an arbitrary position on the substrate of the monocrystalline device when the grain boundary Josephson junction device using the high temperature superconductor is realized. Thus, it is possible to form the two dimensional Josephson junction array, through which a millimeterwave or microwave active device using the Josephson device can be effectively manufactured.

As described above, although the present invention has been described in detail with reference to illustrative embodiments, the invention is not limited thereto and various modifications and changes may be effected by one skilled in the art within the scope of the invention.

What is claimed is:

1. A micro etching system using laser ablation, which comprises:

a laser generator means for generating an ultraviolet beam;

an optical fiber waveguide having an elongated direction for providing a transmitting path of the laser beam radiated from the laser generator means;

a laser beam focusing means provided between the laser generation means and the optical fiber waveguide, said laser beam focusing means comprising a focusing lens for collecting and concentrating the laser beam into the optical fiber, and a lens aligning positioning device for microscopically controlling a position of the focusing lens in three dimensions; and a sample platform for controlling a position of a material to be etched so that the material is etched at a predetermined angle by the beam emitted from an outlet of the optical fiber waveguide.

2. The micro etching system of claim 1, which further comprises a position adjusting means connected to the sample platform for controlling the position of the sample platform.

3. The micro etching system of claim 1, wherein an end of the optical fiber waveguide which forms an inlet for the laser beam is cut off along a direction perpendicular to the elongated direction in order to maximize the amount of the incident laser beam, and the other end of the optical fiber waveguide which forms the outlet for the laser beam is provided for a tapered probe tip in order to minimize the loss of the laser beam.

4. The micro etching system of claim 3, wherein the probe tip has a cone shape so as to concentrate the energy by effectively guiding the light transmitted thereto.

5. The micro etching system of claim 4, wherein the cone angle $\alpha$ is between 36°~40°.

6. The micro etching system of claim 3, wherein the outer surface of the probe tip is clad by a metal layer.

7. The micro etching system of claim 6, wherein the metal cladding is formed by the selected one of the group consisting of aluminum and platinum.

8. The micro etching system of claim 6, wherein the probe tip is clad by selectively coating the outer surface of the probe tip with the metal layer excepting an outlet of the laser beam having a diameter of between 50 nm~200 nm.

9. The micro etching system of claim 6, wherein the thickness of the cladding on the probe tip is 200 nm.

10. The micro etching system of claim 1, wherein the concentrated energy density is 1.1 $GW/cm^2$ or less.

* * * * *